United States Patent [19]
Cox et al.

[11] Patent Number: 6,130,680
[45] Date of Patent: *Oct. 10, 2000

[54] METHOD AND APPARATUS FOR MULTI-LEVEL DEMAND CACHING OF TEXTURES IN A GRAPHICS DISPLAY DEVICE

[75] Inventors: Michael Brian Cox, Menlo Park; Michael J. Shantz, Cupertino, both of Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/982,029

[22] Filed: Dec. 1, 1997

[51] Int. Cl.[7] .............................. G06T 11/40; G06F 13/00

[52] U.S. Cl. ......................... 345/511; 345/521; 345/513; 345/430; 711/122

[58] Field of Search .................................. 345/418, 430, 345/501–503, 520, 521, 526, 507, 509, 515, 508, 511, 203; 711/1, 3, 104, 105, 117–119, 122, 133, 136, 142, 143, 205

[56] References Cited

U.S. PATENT DOCUMENTS

| | | | |
|---|---|---|---|
| 5,801,708 | 9/1998 | Alcorn et al. | 345/430 |
| 5,828,382 | 10/1998 | Wilde | 345/501 |
| 5,829,025 | 10/1998 | Mittal | 711/122 |
| 5,829,027 | 10/1998 | Goodrum | 711/122 |
| 5,831,640 | 11/1998 | Wang et al. | 345/521 |
| 5,844,576 | 12/1998 | Wilde et al. | 345/525 |
| 5,905,509 | 5/1999 | Jones et al. | 345/520 |
| 5,933,158 | 8/1999 | Santos et al. | 345/516 |
| 5,959,639 | 9/1999 | Wada | 345/512 |
| 5,986,677 | 11/1999 | Jones et al. | 345/521 |
| 5,999,198 | 12/1999 | Hoarn et al. | 345/521 |
| 6,000,019 | 12/1999 | Dykstal et al. | 711/157 |

OTHER PUBLICATIONS

D. Cline and P. Egbert, "Interactive Display of Very Large Textures", Visualization '98 Proceedings, Oct. 1998, pp. 343–350, 549.

M. Cox, N. Bhandari, and M. Shantz, "Multi–Level Caching for 3D Graphics Hardware", Proceedings of the 25th International Symposium on Computer Architecture (ISCA98), Barcelona Spain, Jun. 1998, pp. 86–97.

M. Cox and D. Ellsworth, "Managing Big Data for Scientific Visualization", ACM SIGGRAPH'97 Course #4, Aug. 1997, pp. 5–1 to 5–17.

M. Cox, "Large Data Management for Interactive Visualization Design", ACM SIGGRAPH'99 Course #9, System Designs for Visualizing Large–Scale Scientific Data, Los Angeles CA, Aug. 1999, pp. 29–58.

H. Igehy, M. Eldridge, and K. Proudfoot, "Prefetching in a Texture Cache Architecture", 1998 Workshop on Graphics Hardware, Lisbon Portugal, ACM 1998, pp. 133–142.

*Primary Examiner*—Ulka J. Chauhan
*Attorney, Agent, or Firm*—Charles Mirho

[57] ABSTRACT

A computer graphics system for caching textures includes an L3 memory, an L2 cache, and an L1 cache for storing such textures and also includes a graphics accelerator (GA) for mapping these stored textures onto primitives for graphics display. The L3 memory, which has the largest capacity also has the slowest retrieval speed, while the L1 cache has the smallest capacity and the quickest retrieval speed. The textures are divided into a plurality of L2 texture blocks and each L2 texture block is subdivided into a plurality of L1 sub-blocks. During its rendering process, the GA searches the L1 cache for a particular L1 sub-block that is to be applied to a primitive. If such L1 sub-block is stored within the L1 cache, the GA will extract the desired texels (i.e., texture pixels) from the L1 sub-block and apply such texels to the primitive. If the L1 sub-block is not located in the L1 cache, the GA will search the L2 cache for the L1 sub-block. If it is found in the L2 cache, the GA will load the L1 sub-block to the L1 cache. However, if the L1 sub-block is not found within the L2 cache, the GA will load the L1 sub-block from the L3 memory to both the L1 and L2 caches. Advantageously, when the GA requires such L1 sub-block again, the GA will have a speedier access to the L1 sub-block via the L1 and L2 caches.

16 Claims, 11 Drawing Sheets

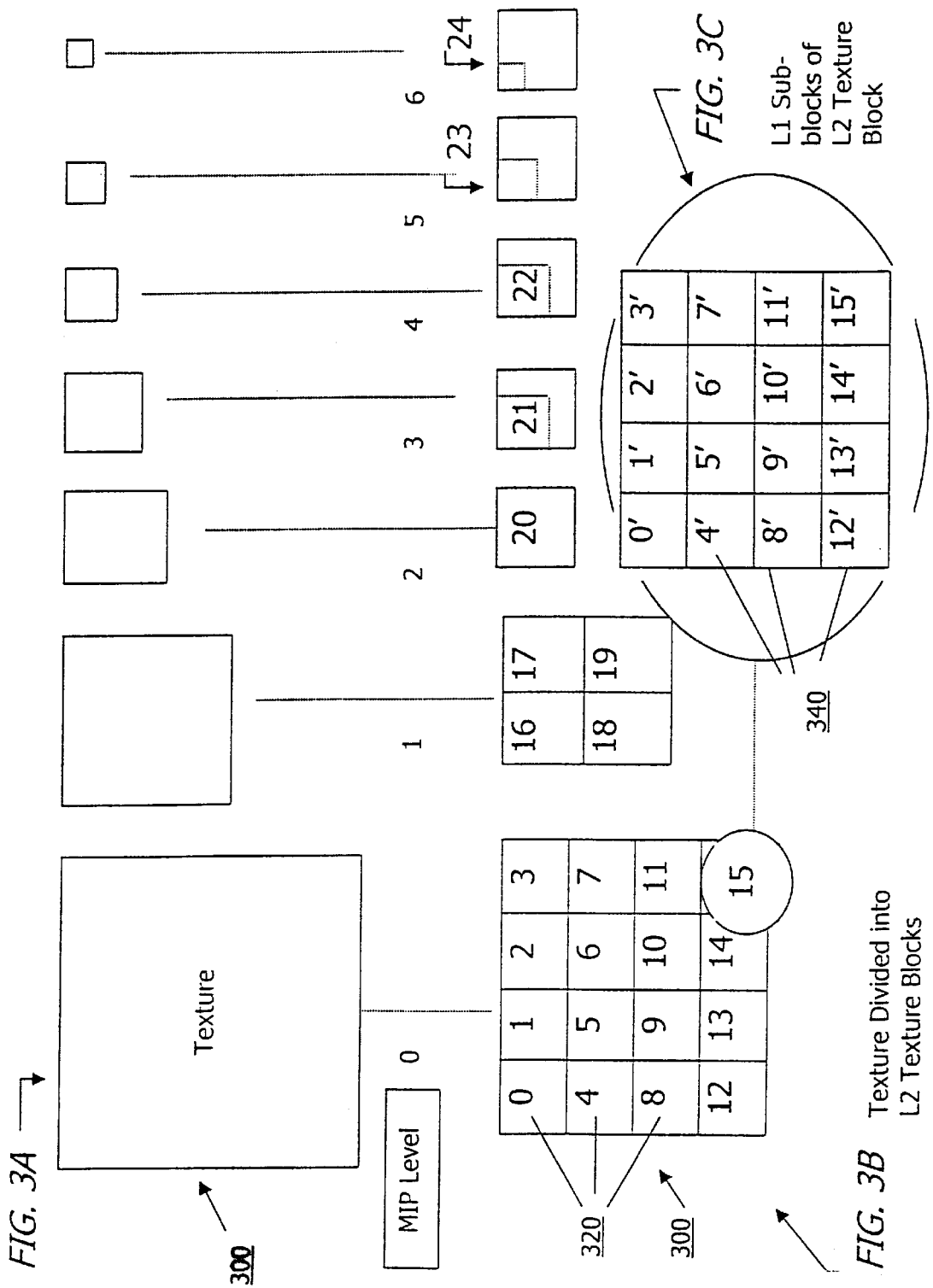

METHOD AND APPARATUS FOR MULTI-LEVEL DEMAND CACHING OF TEXTURES IN A GRAPHICS DISPLAY DEVICE

BACKGROUND OF THE INVENTION

1. Field of the Invention

The present invention relates generally to computer graphics architecture and, more particularly, to a method and apparatus for multi-level demand caching of texture images for mapping on geometrical primitives in a graphics display device.

2. Description of the Related Art

Prior art graphics display devices have the ability to display three-dimensional polygons (i.e., primitives) with texture images mapped on these polygons. These texture images give the computer graphics a realistic or life-like appearance. For example, a texture image may be a picture of a brick facade for application to a three-dimensional polygon representing the framework of a house. Or, alternatively, the texture image may be of a wood grain texture applied to a primitive that forms the shape of a desk. To improve the realism of these graphics, a greater variety of these texture images is desirable. And, consequently, more computer memory is required to store this growing collection of texture images.

Referring to FIG. 1A of the drawings, a prior art graphics architecture (hereinafter referred to as the "push" architecture) for the retrieval of these texture images from memory is shown. This architecture requires a CPU 110 to "push" the texture images from a main memory 130, via a core logic 120, to a texture memory 160, which is considerably smaller and quicker than the main memory 130. The core logic 120 is a chipset that functions to manage the main memory 130 on behalf of the CPU 110. Subsequent to "pushing" the texture from the main memory 130 to the texture memory 160, the desired portion of the texture is then "pulled" from the texture memory 160 to a small on-chip cache 150 resident on a graphics accelerator 140. This architecture has the advantage of providing quick access to desired portions of a particular texture from the texture memory 160, which allows a speedier alternative to retrieving the desired portions of the texture directly from the slower main memory 130. However, while this architecture provides a speedier access to textures stored in the graphics accelerator 140, it suffers from several disadvantages. It requires the CPU 110 to actually download the particular texture for use by the graphics accelerator 140, which increases the complexity of CPU processing. Furthermore, because the size of the texture memory 160 is constrained by the total system cost, the "push" architecture limits the amount of textures that can be used by the application running on the CPU 110, thereby limiting the graphics capabilities of the graphics display device. Moreover, the "push" architecture requires that the entire texture be pushed to the texture memory 160, even though only a few texels (i.e., texture pixels) of the entire texture are typically needed.

To reduce the complexity involved by having the CPU 110 literally "push" the texture to the graphics accelerator 140 and also to alleviate the texture size limitations, another approach known as the Accelerated Graphics Port (AGP) architecture had been proposed. Referring to FIG. 1B, a diagram is shown illustrating such an AGP architecture. The graphics accelerator 140 "pulls" the desired portion of the texture from the main memory 130 and stores this portion of texture within its small on-chip cache 150. Thus, the CPU 110 does not itself retrieve the textures from the main memory 130, but rather, the graphics accelerator 140 accomplishes this task. While this architecture alleviates the complexity of the CPU processing and allows the CPU's application to use more texture than it otherwise could have in the "push" architecture, it also suffers from its own disadvantages. The AGP architecture requires that all of the texture is pulled from the main memory 130. As previously mentioned, a drawback to using the main memory 130 is that its retrieval rate is significantly slower than the retrieval rate of the "push" architecture's local texture memory 160. As a result, the computer system's graphics performance is adversely impacted by the slower retrieval of these textures from the main memory 130.

A possible solution to this problem may be the use of a large high-speed main memory for a quicker access to the stored textures. However, while large-capacity high-speed memory is available, it is quite expensive. And, using such memory could easily double the cost of the computer, thereby placing the personal computer out of reach (from a monetary standpoint) for a number of people for which it was originally intended. Thus, while there is an ample amount of texture that can be used by a particular application running on the CPU 110 in the AGP architecture, the amount of time required for the texture to be applied in the graphics display device is significantly increased due to the retrieval of textures from the slower main memory 130.

The present invention is directed to overcoming, or at least reducing the effects of, one or more of the problems set forth above.

SUMMARY OF THE INVENTION

In one embodiment, a method is provided for caching textures in a computer graphics system. The system includes a first memory, a second memory, and a third memory for storing the textures. Each of the textures are divided into a plurality of texture blocks, and each of the plurality of texture blocks are subdivided into a plurality of texture sub-blocks. The method includes determining whether a selected texture sub-block of the plurality of texture sub-blocks is stored within the first memory; determining whether the selected texture sub-block is stored within the second memory in response to the texture sub-block not being stored in the first memory; and loading the selected texture sub-block from the third memory to at least one of the first and second memories in response to the texture sub-block not being stored in the second memory.

In another embodiment, a computer graphics system is provided for caching textures between memories. The textures are divided into a plurality of texture blocks and each of the plurality of texture blocks are subdivided into a plurality of texture sub-blocks. The system includes a first memory, a second memory, and a third memory, that are adapted to store the plurality of texture sub-blocks. The system further includes a processor adapted to cache the texture sub-blocks within the first, second, and third memories. The processor is further adapted to determine whether a particular texture sub-block is stored within the first and second memories and to load the texture sub-block into the first and second memories in response to the texture sub-block not being stored within the first and second memories.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIGS. 3A–C show a typical texture and the formation of L2 texture blocks and L1 texture sub-blocks for dividing such texture;

DETAILED DESCRIPTION OF SPECIFIC EMBODIMENTS

The following examples are included to demonstrate preferred embodiments of the invention. It should be appreciated by those of skill in the art that the techniques disclosed in the examples that follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed without departing from the spirit and scope of the invention.

Figure 1A:
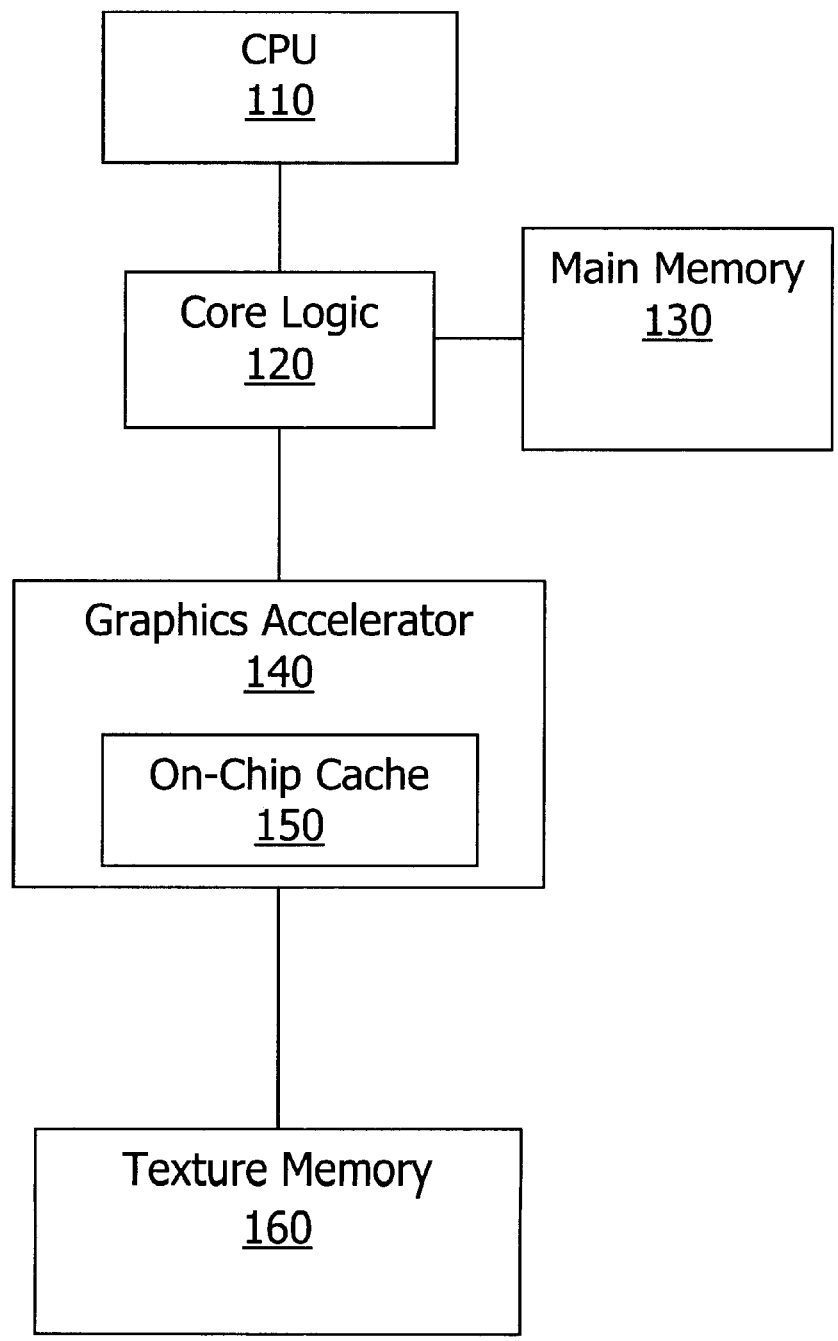
FIGS. 1A and B illustrate block diagrams of prior art computer graphics architectures for texture retrieval from memory.
Figure 1B:
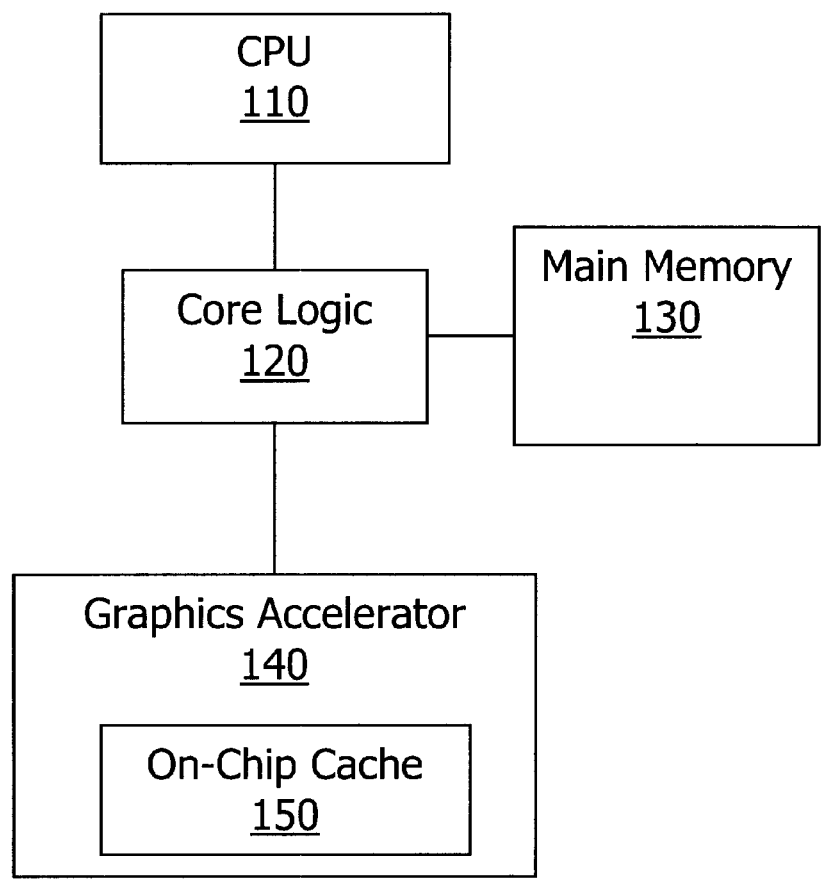
Figure 2A:
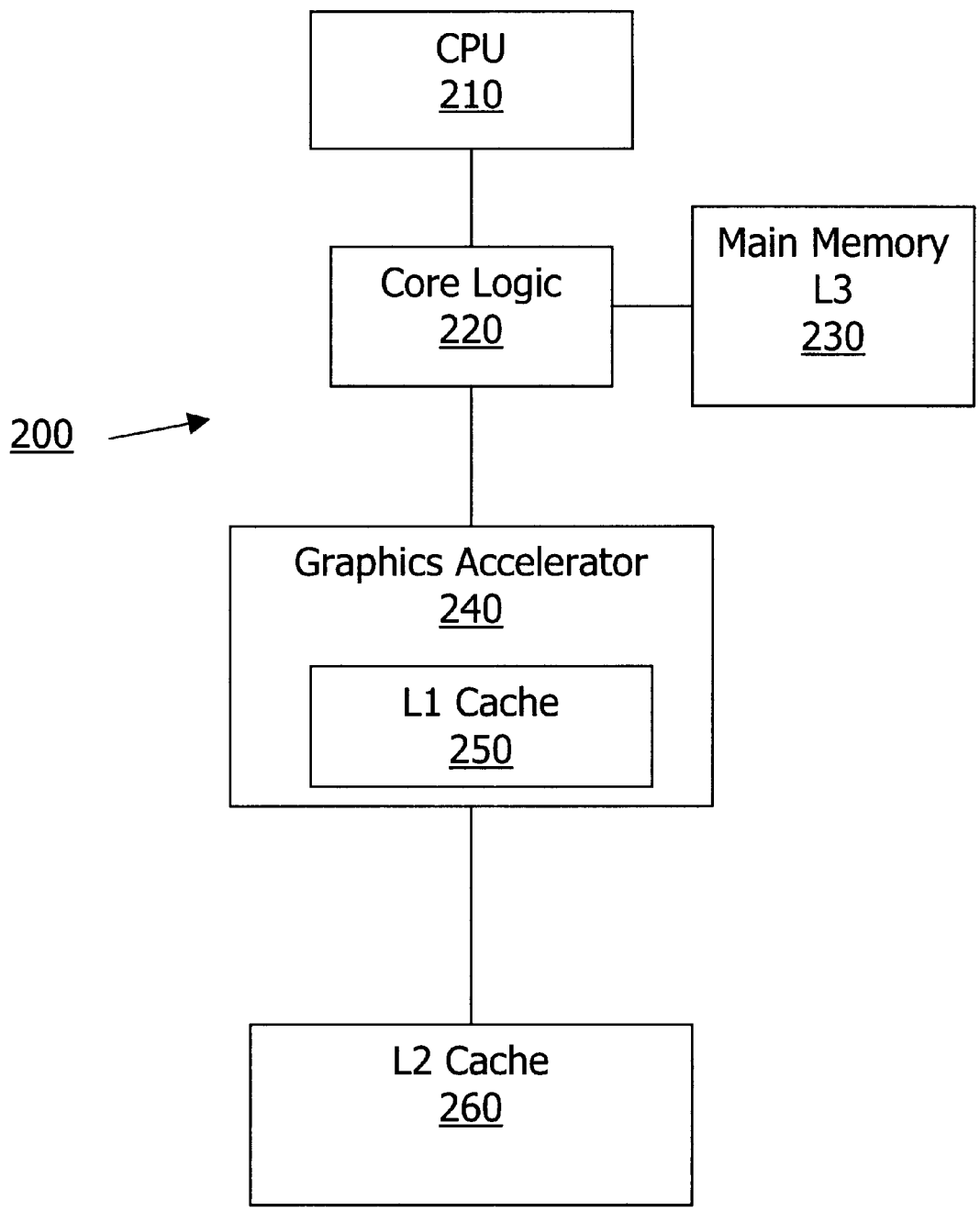
FIG. 2A illustrates a block diagram of a computer graphics architecture for demand caching of textures in accordance with an embodiment of the invention.

Turning now to FIG. 2A of the drawings, a block diagram of a computer graphics architecture 200 for demand caching of textures is shown. A CPU 210, which has a computer graphics application running thereon, generates a series of primitives for display on a graphics display device (not shown). Generally, these primitives are three-dimensional polygons that provide the framework of the displayed object to which a particular texture is to be applied. The CPU 210 keeps track of the different types of textures available to the application and issues a command to a graphics accelerator (GA) 240 to map a specific one of these textures onto a corresponding primitive. Upon receiving this command from the CPU 210, the GA 240 engages in a rendering process whereby it retrieves specific texels (i.e., texture pixels) from a stored texture in memory 230 and subsequently maps such texels on corresponding pixels of the primitive. The specific process by which the GA 240 maps the texels on the primitives is well known to those of ordinary skill in the art. Accordingly, the specifics of such process will not be discussed herein to avoid unnecessarily obscuring the invention.

The majority of texture required by the application running on the CPU 210 is stored in a main memory 230 (hereinafter referred to as "L3 memory"). This is mainly a result of the large capacity of the L3 memory 230, which is 32 MB in one embodiment. Also, because of its large capacity, the L3 memory 230 has a relatively slow retrieval rate, at least compared to much smaller-capacity memories (where it is economically feasible to use a faster type of memory). The GA 240 retrieves these stored textures from the L3 memory 230 via a core logic 220, which is a chipset that functions to manage the L3 memory 230 on behalf of the CPU 210 and the GA 240.

To increase the efficiency of texture retrieval from the L3 memory 230, the GA 240 has the ability to load portions of a particular texture (i.e., a specific block of texels) into smaller-capacity memories that provide speedier access by the GA 240. One of these smaller-capacity memories is an L1 cache 250 that is resident on the GA 240. Preferably, the texels desired by the GA 240 are already present in the L1 cache 250, since this cache provides the quickest access of texels by the GA 240. However, since the capacity of the L1 cache 250 is rather limited compared to the L3 memory 230, (for example, approximately 1 kB), an L2 cache 260, having a larger capacity of, for example, 1 MB, is also provided for the storage of particular blocks of texture. The L2 cache 260 in one embodiment is an external synchronous dynamic random access memory (DRAM), such as RAM-bus DRAM (RDRAM); however, it will be appreciated that the L2 cache 260 could be embodied as an embedded DRAM, on-chip static RAM, external static RAM, etc. without departing from the spirit and scope of the invention.

Figure 2B:
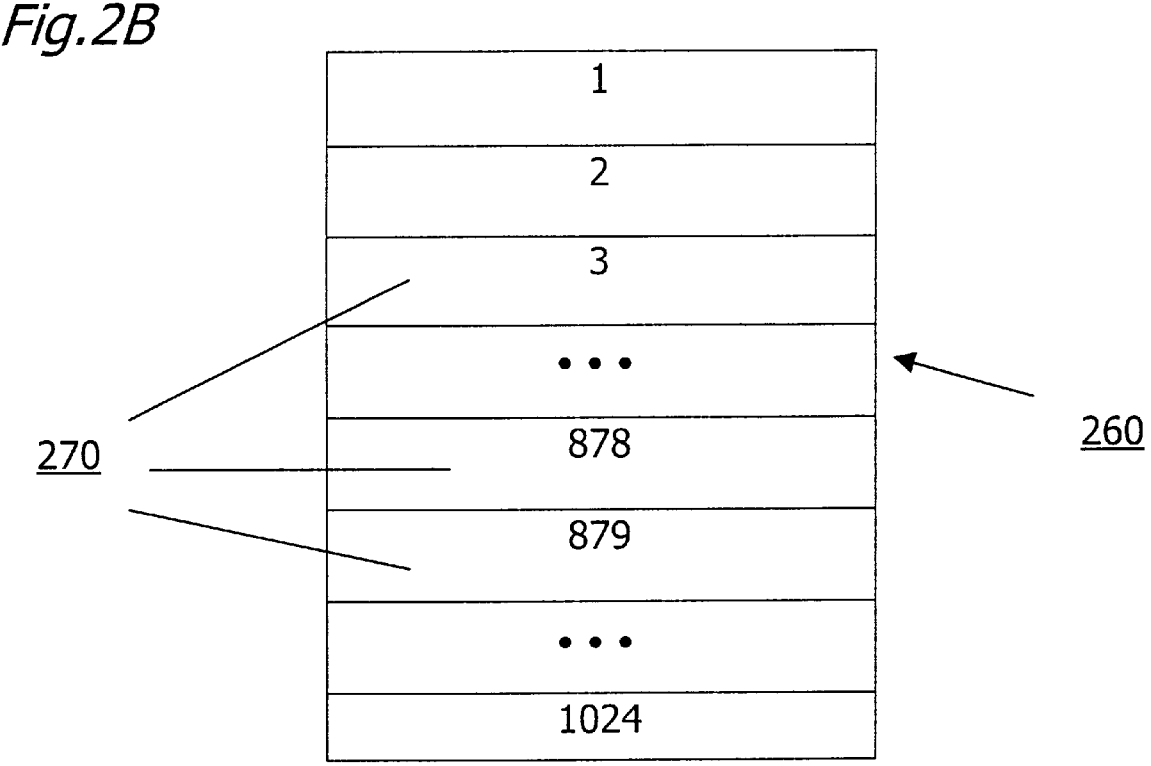
FIG. 2B shows the L2 cache of FIG. 2A divided into a plurality of numbered L2 cache blocks.

Referring to FIG. 2B, the L2 cache 260 is divided into a plurality of L2 cache blocks 270. In the illustrated embodiment, each L2 cache block 270 is selected to be 1 kB in size for storing a particular portion of texture. Thus, since the L2 cache 260 is 1 MB in the illustrated embodiment (as previously mentioned), there are 1,024 L2 cache blocks 270 that form the L2 cache 260. Each of these L2 cache blocks 270 are respectively numbered 1–1,024 as depicted in FIG. 2B. It will be appreciated, however, that the L2 cache blocks 270 could be selected to be smaller or larger than 1 kB, to appropriately divide the L2 cache 260, if so desired.

While the GA 240 cannot access texture from the L2 cache 260 as quickly as it can from its own resident L1 cache 250, the retrieval rate of the L2 cache 260 is still far superior to that of the L3 memory 230. Therefore, if the desired texels of a texture are not present in the L1 cache 250, it is desirable that such texels are present in the L2 cache 260 as opposed to the slower L3 memory 230.

Turning now to FIGS. 3A–C, a texture 300 that is to be applied to a particular primitive by the GA 240 is shown. The texture 300 illustrated in FIG. 3A is a "MIP-mapped" texture of 7 levels, whose lowest level image (i.e., MIP level 0) is 64×64 texels in size and whose highest level image (i.e., MIP level 6) is a single texel. MIP-mapping is a method by which a texture is represented at multiple resolutions to avoid computation by the GA 240 that can alternatively be done before rendering begins. Level 0 of a MIP-mapped texture is an original image, level 1 is an image "averaged down" by a factor of 2 in each dimension, level 2 is an image "averaged down" by a factor of 4 in each dimension, level 3 by a factor of 8 in each dimension and so on. Accordingly, the image of MIP level 0 provides the highest resolution since it is the original image and the image of MIP level 6 provides the lowest resolution since it has been "averaged down" significantly. Textures represented as MIP-maps and the process of rendering using MIP-mapped textures are well known to those of ordinary skill in the art. Accordingly, the specifics of such process will not be discussed herein to avoid unnecessarily obscuring the invention. However, it should be noted that the present invention has a significant advantage of textures stored as MIP-maps in that whenever lower-resolution images (i.e., higher MIP levels) are only required during rendering, the higher-resolution images (i.e., lower MIP levels) need not be retrieved by the GA 240. It should further be noted that the texture size and the number of levels of the MIP-map, as depicted in FIG. 3A, are selected merely for the illustration of the present invention (i.e., the textures can be of various sizes, they may or may not be MIP-mapped, and if MIP-mapped they may have arbitrarily few MIP levels, etc.)

The entire texture 300 is stored in the L3 memory 230 along with other textures utilized by the application running on the CPU 210. When the GA 240 applies the texture 300 to the primitive under the command of the CPU's application, the GA 240 typically will not use all of the texels of the texture 300, but, instead, will generally apply only a select group of these texels. Accordingly, it is preferred to load only a desired portion of the texture 300 (i.e., a block of texels) into the faster memories provided by the L2 cache 260 and the L1 cache 250. By doing so, bandwidth is conserved by preventing the transfer of undesired texels of the texture 300 to these L2 and L1 caches, which will ultimately improve the system's graphics performance. Thus, as shown in FIG. 3B, the texture 300 is divided into a plurality of L2 texture blocks 320 for each MIP level of the texture 300. For example, the L2 texture blocks 320 are respectively labeled block numbers 0–15 for MIP level 0 of the texture 300. It should be noted that the particular assignment of block numbers to levels of the MIP-map in FIG. 3B is merely selected for illustration of the present invention (i.e., the blocks may be alternatively numbered, lower-resolution levels of the MIP may be "packed" together in single blocks, etc.)

Any one of the L2 texture blocks 320 can be stored in the L2 cache blocks 270 of the L2 cache 260 (i.e., L2 texture blocks 320 are the numbered blocks of a given texture, whereas the L2 cache blocks 270 are the numbered blocks of available memory in the L2 cache 260). In the illustrated embodiment, the L2 texture blocks 320 (and therefore the L2 cache blocks 270) are 16×16 texels in size. It will be appreciated, however, that the size of the L2 texture blocks 320 can be of any size appropriate to divide the texture 300 and need not necessarily be 16×16. In the illustrated embodiment, any one of these L2 texture blocks 320 is a suitable size for storage in the L2 cache block 270 of the L2 cache 260; however, they are not appropriate for storage in the smaller L1 cache 250. This is a result of the L2 texture block 320 being approximately 1 kB in size, which is the same size as the L1 cache 250 itself (in the illustrated embodiment). Since it is desirable to have texel blocks of multiple textures present within the L1 cache 250 at the same time, each of these L2 texture blocks 320 are further subdivided into a plurality of L1 texture sub-blocks 340, which in the illustrated embodiment are 4×4 texels in size. Referring to FIGS. 3B and C, the L2 texture block labeled "15", for example, is shown to be divided into a plurality of L1 texture sub-blocks 340 (labeled 0'–15', respectively). In accordance with the illustrated embodiment, each one of the L2 texture blocks 320 comprises 16 smaller L1 texture sub-blocks 340. Thus, the entire texture 300 will contain a total of 256 L1 texture sub-blocks 340, each of which is approximately 64 bytes in size. Accordingly, these L1 texture sub-blocks 340 are suitable for simultaneous storage in the L1 cache 250 along with other L1 texture sub-blocks from various other textures (not shown).

In accordance with one embodiment, if a texel desired by the GA 240 resides in the L3 memory 230, the GA 240 will load only the appropriate L1 texture sub-block 340 (containing the desired texel) to an appropriate L2 cache block 270 within the L2 cache 260. Although the L2 cache 260 has enough space allocated to store an entire L2 texture block 320, only individual L1 texture sub-blocks 340 (or "sectors") are loaded into the L2 cache 260 on an "as needed" basis. Thus, while the entire contents of an L2 texture block 320 can eventually reside within an L2 cache block 270 of the L2 cache 260, such contents are loaded into the L2 cache 260 one L1 texture sub-block 340 at a time. Loading one L1 texture sub-block 340 at a time conserves bandwidth between the L3 and L2 memories 230, 260. Additionally, it is highly probable that the GA 240 will not need all of the texels within any given L2 texture block 320. Therefore, it is desirable to load portions of the L2 texture blocks 320 (i.e., by L1 texture sub-blocks 340) into an appropriate L2 cache block 270 of the L2 cache 260 as required by the GA 240. It is possible, however, to transfer an entire L2 texture block 320 into an L2 cache block 270 of the L2 cache 260 in a single operation, if so desired, providing that bandwidth availability permits such an L2 texture block 320 transfer. In addition to loading the L1 texture sub-block 340 to the L2 cache 260, the GA 240 will also load the L1 texture sub-block 340 to its own L1 cache 250. Though it may seem redundant to load the same L1 texture sub-block 340 from the L3 memory 230 to both the L1 and L2 caches 250, 260, such redundant loading actually improves the efficiency of retrieving texels. That is, because the L1 cache 250 is only 1 kB in size, it may not be able to hold a particular L1 texture sub-block 340 too long before having to discard the sub-block 340. Thus, if the discarded L1 texture sub-block 340 is subsequently required again by the GA 240, the L1 texture sub-block 340 can be quickly retrieved from the L2 cache 260 as opposed to retrieving it from the slower L3 memory 230.

The texture sub-block 340 transfers between the memories 230, 260, 250 improves the efficiency of texel access by taking advantage of the quicker access speed of the L2 and L1 caches 260, 250. Generally, accessing texels for application by the GA 240 tends to be localized within a specific texture. Thus, when applying a texel to the primitive, usually the GA 240 will commonly need other texels from the texture that reside proximate to the applied texel. Accordingly, by loading an L1 texture sub-block 340 into the faster memory of L2 and L1 260, 250, the GA 240 can quickly access these other texels when they need to be applied to the primitive, as opposed to accessing such texels from the slower L3 memory 230 each time one of these texels is needed.

Figure 4:
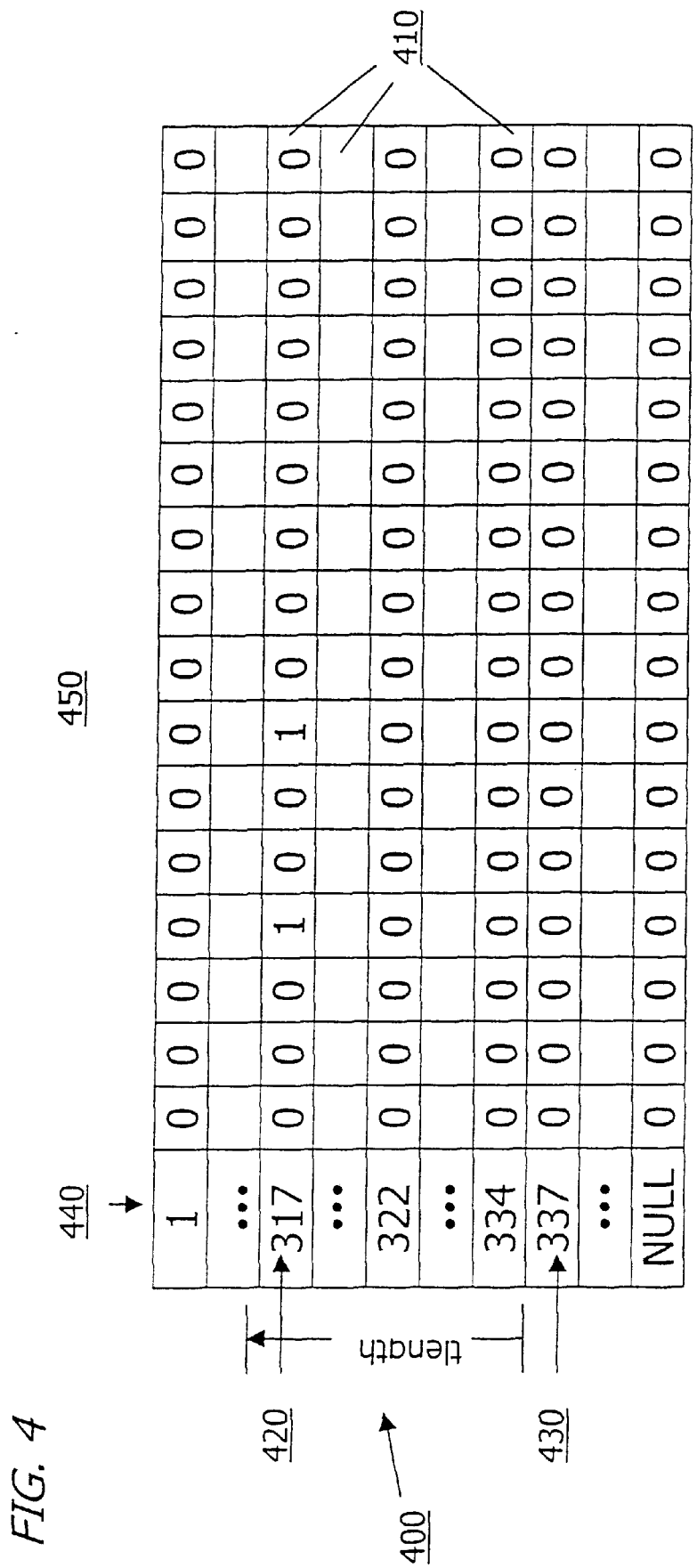
FIG. 4 illustrates a texture table used to determine the status of texture blocks within memory.

For the GA 240 to determine the current status of the L1 texture sub-blocks 340 (i.e., whether or not certain L1 texture sub-blocks 340 have been loaded into the L2 cache 260 from the L3 memory 230), the GA 240 refers to a texture table 400, as shown in FIG. 4. The desired L1 texture sub-block 340 may have already been loaded into the L2 cache 260 during a prior retrieval of another texel. Accordingly, the table 400 would indicate this to the GA 240 to prevent redundant loading of a particular L1 texture sub-block 340 into the L2 cache 260. The table 400, residing on the GA 240 (or, possibly in external memory), is also used to obtain the actual memory address of a particular L2 texture block 320 within the L2 cache 260. The GA 240 will update the texture table 400 as it loads various L1 texture sub-blocks 340 into the L2 cache 260. While the GA 240 is responsible for updating the status of the L1 texture sub-blocks 340 within the table 400, the CPU 210 is responsible for allocating and initializing entries within the table 400.

When a new texture is required by an application, the CPU 210 allocates a sufficient number of contiguous entries 410 within the texture table 400 and maintains for each texture that may have blocks stored within the L2 cache 260 its texture table starting entry $t_{start}$. The entry $t_{start}$ is the row number (i.e., the index) in the texture table at which the first entry of a given texture starts. For example, if the application introduces a new texture "j" (that is 64×64 texels in size), the CPU 210 will allocate within the table 400 16 contiguous entries, one entry for each of the 16 L2 texture blocks 320 that divide texture "j". The CPU 210 will then define the first entry 420 allocated to texture "j" in the texture table as $t_{start}$. The CPU 210 also maintains a length $t_{length}$ that indicates the total number of entries within table 400 allocated to the texture "j". Essentially, the value of $t_{length}$ is the total number of L2 texture blocks 320 within a given texture. Thus, in this particular example, the value of $t_{length}$ for texture "j" is set equal to 16. The table 400 will also have entries allocated to other textures, such as texture "k", for example, with a $t_{start}$ entry designated by 430. Of course in this particular example, the $t_{start}$ entry for texture "k" must be more than 16 entries from the $t_{start}$ entry of texture "j" (because texture "j" has 16 L2 texture blocks 320, i.e. its $t_{length}$ is 16 entries). For each entry 410 within the table 400, there is an L2 block number field 440 (hereinafter referred to as "L2_block_cache"), which indicates the L2 cache block 270 number where a particular L2 texture block 320 is stored within the entire L2 cache 260. It should be noted that each L2 cache block 270 within the L2 cache 260 has two different block numbers assigned thereto. The first block number (hereinafter referred to as "L2_block_texture") is the L2 block number (e.g., 0–15) of the L2 texture block 320 within the texture itself. Thus, in the particular example, the 16 L2 texture blocks 320 of texture "j" have L2_block_texture numbers ranging from zero to 15. That is, the L2 texture blocks 320 for texture "j" are essentially labeled in the same manner as the L2 texture blocks 320 of texture 300 were in FIG. 3B. The second block number (i.e., L2_block_cache) is the L2 block number of the L2 cache block 270 at which the L2 texture block 320 may actually be stored in the L2 cache 260. The L2 cache 260, in accordance with one embodiment, has a capacity of approximately 1,024 L2 texture blocks 320, since each L2 texture block 320 is about 1 kB in size and the L2 cache 260 is 1 MB in size. Accordingly, each of the L2 cache blocks 270 (within the entire L2 cache 260) are consecutively assigned a L2_block cache number of 1 to 1,024. Thus, it is these L2_block_cache numbers that occupy the field 440 within the texture table 400.

For the GA 240 to be able to retrieve a particular L2 texture block 320 from the L2 cache 260, it needs to know the texture address (i.e. the L2 memory byte address) of the L2 texture block 320. The texture address $L2_{addr\_L2cache}$ of a particular L2 texture block 320 within the L2 cache 260 can be derived from the L2_block_cache number 440 of the texture table 400. Essentially, $L2_{addr\_L2cache}$ is obtained by multiplying the L2_block_cache number 440 (for a particular L2 texture block 320) by the actual size of the L2 block. For example, $L2_{addr\_L2cache}$ for the first L2 texture block 320 of texture "j" (shown at 420) would be its L2_block_cache number (i.e., 317) multiplied by 1,024 bytes (i.e., the size of the L2 texture block 320).

In an alternative embodiment, the actual texture memory address $L2_{addr\_L2cache}$ could be placed in field 440 in lieu of the L2_block_cache number. Albeit this would reduce the intermediate step of calculating $L2_{addr\_L2cache}$ (as in the illustrated embodiment), it would require twice as many bits in field 440 to store the actual value of $L2_{addr\_L2cache}$. Thus, calculating $L2_{addr\_L2cache}$ from the L2_block_cache number 440 advantageously requires less storage space for the texture table 400 (since fewer bits are used).

The texture table 400 also comprises a sector bit field 450. Each of these sector bits 450 is representative of a particular L1 texture sub-block 340 that is a part of a particular L2 texture block 320. Since each L2 texture block 320 of texture "j" (in the illustrated embodiment) has 16 L1 texture sub-blocks 340, the sector bits 450 comprise 16 bits in total, with each bit representing one particular L1 texture sub-block 340 within the particular L2 texture block 320 of texture "j". When the GA 240 loads a specific L1 texture sub-block 340 from the L3 memory 230 to the L2 cache 260, the GA 240 places a "1" in the sector bit 450 corresponding to the loaded L1 texture sub-block 340. For example, the L2 texture block 320 represented by the entry 420 (i.e., having a L2_block_cache number of 317) has its fourth and seventh L1 texture sub-blocks 340 loaded into the L2 cache 260, as indicated by the corresponding fourth and seventh sector bits being set to "1". All of the other L1 texture sub-blocks 340 (i.e., those other than the fourth and seventh) still reside in the L3 memory 230 because their corresponding sector bits are set to zero. Thus, when the GA 240 loads an L1 texture sub-block 340 from the L3 memory 230 to an L2 cache block 270 in the L2 cache 260, it will update the sector bit field 450 for the particular L1 texture sub-block 340 that the GA 240 loaded into the L2 cache 260. Accordingly, the GA 240 will not perform a redundant loading operation of an L1 texture sub-block 340 from the L3 memory 230 as a result of this sector bit field 450.

Figure 5:
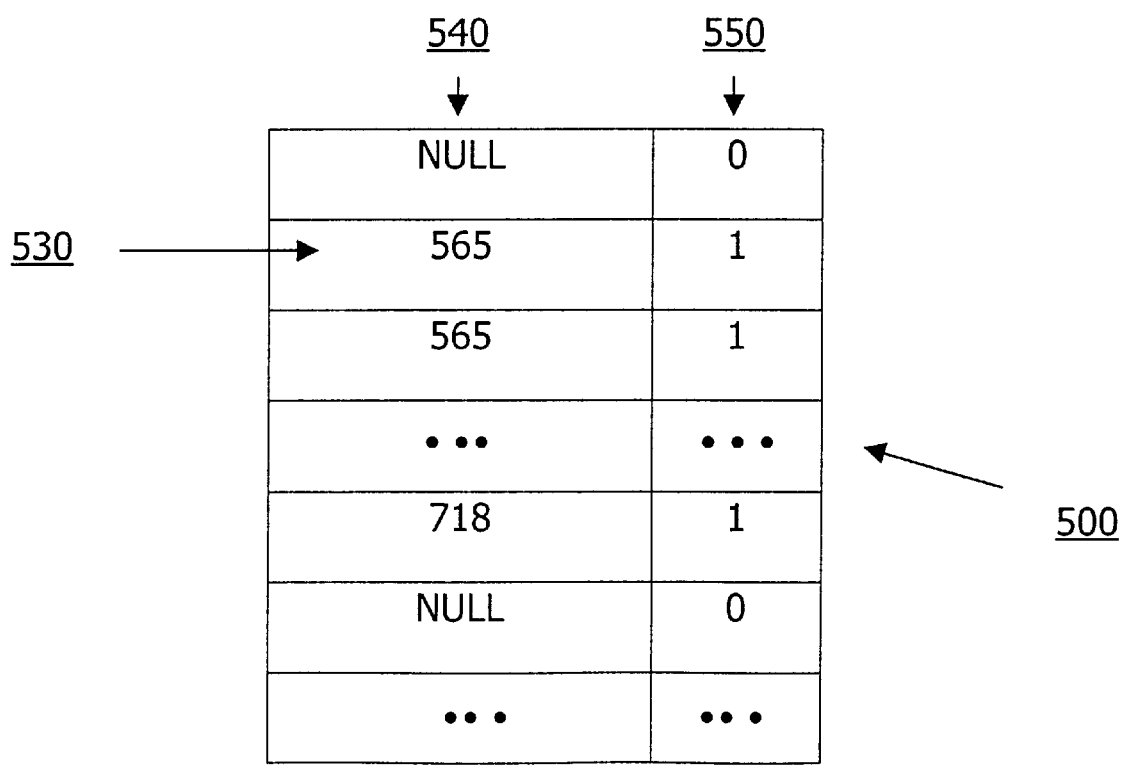
FIG. 5 depicts a block replacement table list used to determine which texture blocks to delete from memory.

In addition to maintaining the texture table 400, the GA 240 also maintains a block replacement list 500, as shown in FIG. 5. If the GA 240 needs to load a block of texels from the L3 memory 230 to the L2 cache 260, and all the L2 cache blocks 270 are in use, then the GA 240 needs to make space in the L2 cache 260 for the desired block of texels from the L3 memory 230. Preferably, the GA 240 deletes from the L2 cache 260 an L2 cache block 270 that it no longer needs (or at least hasn't used in a long period of time). Accordingly, the block replacement list 500 is used to determine which L2 cache block 270 within the L2 cache 260 has not been used recently. In the illustrated embodiment, the "clock" algorithm is used to find approximately the L2 cache block 270 in the L2 cache 260 that has been "least recently used (LRU)." The "clock" algorithm is well known to those of ordinary skill in the art. Accordingly, the details of the "clock" algorithm will not be specifically disclosed herein to avoid unnecessarily obscuring of the present invention; however, a detailed description of such "clock" algorithm is fully disclosed in Computer Architecture and Parallel Processing, by K. Hwang and F. Briggs, McGraw-Hill, New York, N.Y., 1984, the entire contents of which are incorporated herein by reference. Additionally, it will be appreciated that, as an alternative to the "clock" algorithm, other known implementations could be used to select approximately the block that has been least recently used or even the exact block that has been least recently used without departing from the spirit and scope of the present invention.

Referring again to FIG. 5, the block replacement list 500 is an array that is as long as there are L2 cache blocks 270 in the L2 cache 260. That is, the block replacement list 500 is as long (i.e., has as many entries) as the largest L2_block_cache number 440. Each row (i.e., entry) in the block replacement list 500 directly corresponds to an L2 cache block 270 in the L2 cache 260. For example, the fifth block replacement list entry corresponds to the fifth L2 cache block 270 within the L2 cache 260. Each entry in the block replacement list 500 stores two items of information: a t_table_index 540 and a corresponding active bit field 550. For a given entry of the block replacement list 500, the t_table_index field 540 stores a row number of (i.e., an index into) the texture table 400. This row number is the texture table 400 entry to which the L2 cache block 270 has been allocated. If any row within the block replacement list 500 has a t_table_index 550 value of zero, then the L2 cache block 270 corresponding to that row of the block replacement list 500 has not been allocated to any texture.

The second field of each entry of the block replacement list 500 is an "active" bit field 550. If an L2 cache block 270 is deemed to be active, the active bit field 550 for that particular L2 cache block will be "1". Conversely, a "0" in the active bit field 550 indicates that a particular L2 cache block 270 is not active, and thus, such particular L2 cache block 270 would be a good candidate for replacement. Whenever the GA 240 needs to load a block of texels from the L3 memory 230 to the L2 cache 260, and all L2 cache blocks 270 are in use, then the GA 240 must choose a "victim" texture from which to "steal" an L2 cache block 270. That is, it must select some entry in the texture table 400 that has a L2_block_cache field 440 that is not zero (since a texture table row 540 that has an L2_block_cache allocated to it must have an L2_block_cache number 440 that is non-zero). The GA 240 looks for a "victim" for block replacement by "stepping" down the entries of the block replacement list 500. In general, the GA 240 steps down the list until it reaches the end, whereupon it starts again at the beginning. Whenever called upon to find a victim block for replacement, the GA 240 does not begin at the same place every time, but rather begins at the row specified in a variable current_clock 530. Each time it must find a block for replacement, the GA 240 begins at the row specified by current_clock 530, and after it has found a victim it sets current_clock 530 to the row number of the entry following the newly allocated block. By repeating this procedure each time it must find a victim, the GA 240 steps around and around the block replacement list 500, hence the name "clock".

A victim for replacement is one whose active bit 550 is "0". Until the GA 240 finds such a row within the block replacement list 500 with an active bit 550 of "0", it continues stepping down the block replacement list 500. To ensure that it finds a block eventually, it also clears the active bit 550 to "0" of each row that it visits, whenever the active bit 550 is "1". At the worst then, the GA 240 must walk around the entire block replacement list 500 to where it started in order to find an entry with an active bit 550 of "0". The active bit 550 is set to "1" whenever the GA 240 downloads an L1 sub-block 340 from the L3 memory 230 to the L2 cache 260, or whenever the GA 240 downloads an L1 sub-block 340 from the L2 cache 260 to the L1 cache 250.

When the GA 240 finds a row in the block replacement list 500 with an active bit 550 of "0", the GA 240 extracts the value of the t_table_index 540 at the row within the block replacement list 500, and uses the value of the t_table_index 540 to index into a corresponding row number of the texture table 400. Subsequently, the GA 240 sets the L2_block_cache field 440 at this row within the texture table 400 to the value "0". This serves to "steal" the L2 cache block 270 corresponding to the previous value of L2_block_cache from the particular texture. Then, the GA 240 sets the active bit 550 at the row in the block replacement list 500 to "1". This is done because the L2 cache block 270 corresponding to the number of the row within the block replacement list 500 will immediately be allocated to a new L2 texture block 320. The GA 240 then finds the appropriate entry within the texture table 400 that corresponds to the L2 texture block 320 to which the L2 cache block 270 will be given. At the entry within the texture table 400, the GA 240 sets the value of L2_block_cache to be the value of the row within the block replacement list 500. Subsequently, the GA 240 also sets the value of t_table_index 540 of the row within the block replacement list 500 to the value of the row within the texture table 400 to which the L2 cache block 270 has just been allocated. Then, the GA 240 sets the value of the current_clock 530 register to the number of the row following the L2 cache block 270 entry that was just allocated for a specific L2 texture block 320.

As opposed to maintaining a separate block replacement list 500, in an alternative embodiment, an extra bit field could be added to the texture table 400 for each L2 block entry. The extra bit field would indicate whether or not a particular L2 texture block 320 is deemed active or not.

During the rendering process, the GA 240 receives from the application information about the "current texture" that should be applied to a particular primitive. This information includes the texture's starting entry $t_{start}$ in the texture table 400, as well as the number of contiguous entries $t_{length}$ required for that texture. As previously discussed, the application is responsible for allocating contiguous entries within the texture table 400 sufficient to enumerate all blocks of a new texture. The application may also choose to delete textures from use by the GA 240, and consequently free those textures' entries from the texture table 400 for use by newer textures. When the application requests that a texture with $t_{start}$ and $t_{length}$ be deleted, the GA 240 "steps" down the entries in the texture table 400 from $t_{start}$ to ($t_{start}+t_{length}-1$), and "frees" each block that was previously allocated to the given texture. The GA 240 does so row by row of each of the entries within the texture table 400. For each such row, the GA 240 extracts the value of L2_block_cache and (if the value is non-zero) finds the row within the block replacement list 500 that corresponds to that value. The GA 240 "frees" the block (i.e., returns it to a "pool" of available blocks) by setting the t_table_index field 540 of the entry to the value "0", and by setting the active bit of the entry to the value "0". It also clears all fields of each row of the texture table from $t_{start}$ to ($t_{start}+t_{length}-1$).

For the GA 240 to utilize the texture table 400 to find a particular cached L2 texture block 320, it needs to determine the L2_block_texture number for the L2 texture block 320. The following description explains the process used by the GA 240 to obtain the L2_block_texture number for use with the texture table 400.

Figure 6A:
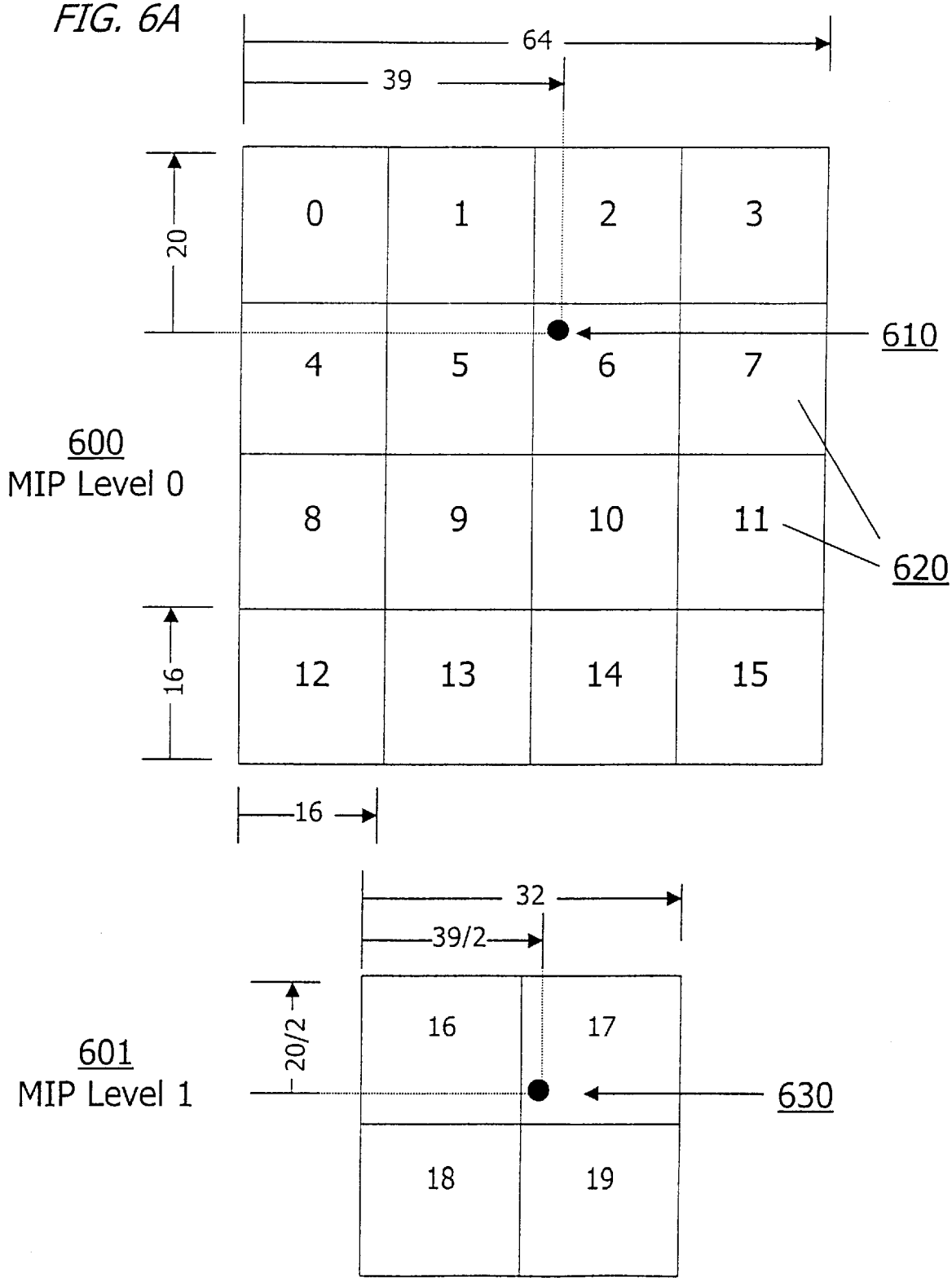
FIG. 6A shows a sample texture "j" divided into a plurality of L2 blocks.
Figure 6B:
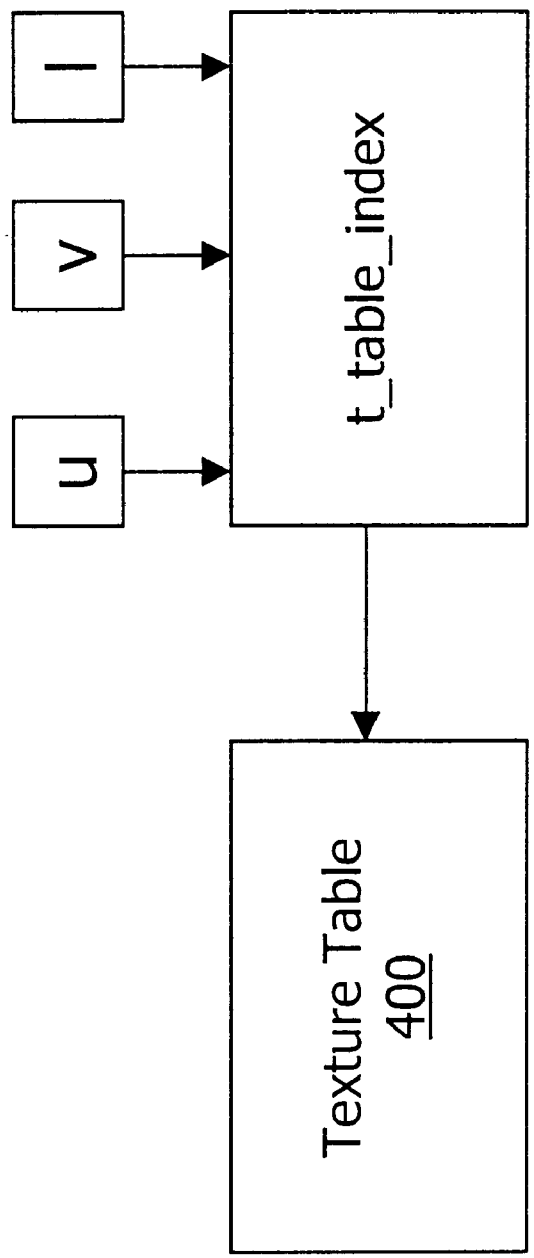
FIG. 6B illustrates a block diagram of a concept used for determining a texture address for a particular texture block.

Referring to FIG. 6A, a sample MIP-mapped texture 600, 601 is shown that is 64×64 texels in size at its highest resolution 600 (which corresponds to MIP-level 0), 32×32 texels in size at its next-highest resolution 601 (which corresponds to MIP-level 1), and so forth. The other MIP-levels are not shown in FIG. 6A for the sake of simplicity in the illustration of the present invention. The MIP-mapped texture 600,601 is divided into a plurality of L2 texture blocks 620, designated by numbers in the figure from 0 to 19 (for MIP-levels 0 and 1, as was done to texture 300 in FIG. 3). Each of the L2 texture blocks 620 has a width $W_2$ of 16 texels and a height $H_{L2}$ of 16 texels, i.e., the L2 blocks are 16×16 in size. The GA 240 determines which L2 texture block 620 includes the desired texel. The methodology used by the GA 240 is described in conjunction with FIG. 6B.

As previously noted, during the rendering process the GA 240 receives information from the application about the "current texture" that should be applied to a particular primitive. This information includes the texture's starting entry $t_{start}$ in the texture table 400 as well as the number of contiguous entries $t_{length}$ that are required for the L2 texture blocks 320 of that texture. For example, assume these correspond to texture "j" as it appears in the texture table 400. The GA 240 also obtains the desired texel's location within the texture by the texel's coordinate address variables u and v, and by the MIP level l. The process by which these variables u, v, and l are obtained by the GA 240 is well known to those of ordinary skill in the art and, therefore, need not be discussed herein as it is beyond the scope of this invention. If, for example, the texel's coordinate address variables u, v, and l are 39, 20, and 0, respectively, the location of the desired texel would be 39 texels to the right and 20 texels down from the upper-left hand corner of the texture's MIP-level "0" image 600 as shown in FIG. 6A. By visual inspection of the texture 600, this would place the desired texel at the reference point 610 within the L2 texture block 620 labeled "6". If, however, the texel's coordinate address variables were the same u and v (39 and 20) but with different MIP level l of "1", the location of the desired texel would be 39/2 to the right and 20/2 texels down from the upper-left hand corner of the texture's level 1 image 601 as shown in FIG. 6A (since each successive level of the MIP-map is an image decimated by a factor of 2 in each of the u and v dimensions). By visual inspection of the texture 601, this would place the desired texel at the reference point 630 within the L2 texture block 620 labeled "17". Since the GA 240 is not capable of performing this visual inspection, it needs to calculate the L2 block number $N_{L2}$ (which is the same as the L2_block_texture number as discussed previously) containing the desired texel. And, such is accomplished using the formulae below. The example provided for above where the variables u, v, and l are 39, 20, and 1, respectively, will be used for illustration of such calculation.

$$c_{L2} = \frac{u/2^l}{W_{L2}} = \frac{39/2}{16} = 1 \text{ (with a remainder 3.5)}$$

$$r_{L2} = \frac{v/2^l}{H_{L2}} = \frac{20/2}{16} = 10/16 = 0 \text{ (with remainder 10)}$$

$$N_{L2} = \left[\sum_{0 \leq k < l} \frac{(n_{rL2} \cdot n_{cL2})}{4^k}\right] + r_{L2} \cdot \frac{n_{cL2}}{2^l} + c_{L2} =$$

$$\frac{4 \cdot 4}{2^0} + \frac{0 \cdot 4}{2^1} + 1 = 17$$

where:
$c_{L2}$ is the L2 block column number
$r_{L2}$ is the L2 block row number
u, v are the desired texel's coordinate address
l is the MIP level
$W_{L2}$ is the width of each L2 block
$H_{L2}$ is the height of each L2 block
$N_{L2}$ is the L2 block number that contains the desired pixel
$n_{rL2}$ is the number of rows of L2 blocks for the texture's MIP level "0" (i.e. highest resolution level 600)
$n_{cL2}$ is the number of columns of L2 blocks for the texture's MIP level "0"

When the L2 block column and row numbers (i.e., $c_{L2}$ and $r_{L2}$, respectively) are obtained, only the dividend is taken and the remainder is completely disregarded. Thus, in the example above, $c_{L2}=1$ and $r_{L2}=0$. The L2 block number $N_{L2}$ that includes the desired texel 630 is calculated to be "17".

Thus, subsequent to determining this L2 block number $N_{L2}$, the GA 240 can use the texture table 400 to determine the texture address $L2_{addr\_L2cache}$ for the particular L2 block for texture "j" in FIG. 6A.

Referring back to the table 400 in FIG. 4, the value of $N_{L2}$ is essentially a texture offset that is added to the value of $t_{start}$ (designated by 420 for texture "j"). Thus, the entry for the L2 block 620 containing the desired texel would be at $t_{start}+17$ (the entries are indexed from zero). Therefore, the L2_block_cache number 440 for this desired texel 610 is "334" according to the texture table 400. And, the $L_2\_addr_{\_L2cache}$ for the L2 texture block 620 can be determined by multiplying "334" by the L2 block size (i.e., 1 kB), as previously discussed. The GA 240 can also determine if any of its L1 sub-blocks 340 were loaded into the L2 cache 260 from the L3 memory 230 by inspecting the sector bit field 450 (as previously discussed).

The GA 240 also determines the texture address $L1_{addr\_L2cache}$ for the particular L1 sub-block (not shown in FIG. 6A) containing the desired texel 630. This is accomplished by taking the remainder portion of $c_{L2}$ and $r_{L2}$ (that was determined above and disregarded) and setting the remainder of $c_{L2}$ equal to $u_{offset}$ and setting the remainder of $r_{L2}$ equal to $v_{offset}$. The values obtained by $u_{offset}$ and $v_{offset}$ will give the texel coordinate position of the desired texel 630 within the particular L2 block 620 within which it resides (i.e., within L2 block "17"). Thus, according to the particular example, $u_{offset}=3.5$ and $v_{offset}=10$. The L1 sub-block number $N_{L1}$ is similarly calculated for the L1 sub-block as it was for the L2 block 620 except that the values of $u_{offset}$ and $v_{offset}$ are used in place of u and v, respectively, and the values of $W_{L1}$ and $H_{L1}$ are each set equal to 4 (as opposed to 16 for L2, i.e., the width and height of an L1 sub-block is 4). Accordingly, the L1 sub-block number $N_{L1}$ is calculated using the formulae below:

$$c_{L1} = \frac{u_{offset}}{W_{L1}} = \frac{3.5}{4} = 0 \text{ (with a remainder of 3.5)}$$

$$r_{L1} = \frac{v_{offset}}{H_{L1}} = \frac{10}{4} = 2 \text{ (with a remainder of 2)}$$

$$N_{L1} = r_{L1} \cdot n_{cL1} + c_{L1} = 2 \cdot 4 + 0 = 8$$

where, in addition to the variables defined previously,
$n_{cL1}$ is the number of columns of L1 sub-blocks within an L2 block Thus, the L1 sub-block number $N_{L1}$ is calculated to be 8, which indicates that the L1 sub-block is in position 8' (see FIG. 3C) of the L2 block "17". Once the L1 sub-block number $N_{L1}$ is determined, the texture address $L1_{addr\_L2cache}$ for the L1 sub-block can be calculated by multiplying the L1 sub-block number $N_{L1}$ by the size of the L1 sub-block (i.e., 64 bytes) and adding the result to the texture address $L2_{addr\_L2cache}$ for the L2 block 620 (obtained above).

The texture address $L1_{addr\_L2cache}$ obtained for the L1 sub-block in the L2 cache 260 will be different from the texture address for the same L1 sub-block if it happened to reside in the L1 cache 250 or the L3 memory 230. That is, each of the memories (L1, L2, and L3) utilize their own distinct addressing scheme. The texture address for an L1 sub-block in the L1 cache 250 or L3 memory 230 can be derived from the L2 block and L1 sub-block numbers $N_{L2}$ and $N_{L1}$, respectively, (obtained above) as follows.

To determine the specific texture address for an L1 sub-block 340 within the L1 cache 250 (which is designated as $L1_{addr\_L1}$ cache), the formula shown below is utilized.

$$L1_{addr\_L1cache} = \text{REMAINDER of } ((N_{L2} \cdot n_{L1/L2} + N_{L1})/n_{L1cache})$$

where, in addition to the variables defined previously, $n_{L1/L2}$ is the number of L1 sub-blocks within a single L2 block $n_{L1cache}$ is the total number of L1 blocks that can be stored in the L1 cache 250

Accordingly, once the texture address $L1_{addr\_L1cache}$ is calculated, the GA 240 can determine whether or not such L1 sub-block 340 exists in the L1 cache 250, and if it does, can access the L1 sub-block 340 from the L1 cache 250 using such address.

To determine if an L1 sub-block 340 exists in the L3 memory 230, and to access such if it does, the GA 240 also calculates the texture address $L1_{addr\_L3mem}$, which is obtained from the formula below.

$$L1_{addr\_L3mem} = L3\_start\_texture + (N_{L2} \cdot S_{L2}) + (N_{L1} \cdot S_{L1})$$

where, in addition to the variables defined previously,

| | |
|---|---|
| L3_start_texture | is the starting address of the texture in L3 memory |
| $S_{L2}$ | is the block size (in bytes) of a single L2 texture block (i.e., 16 × 16 × texel_size in the illustrated embodiment) |
| $S_{L1}$ | is the block size (in bytes) of a single L1 texture sub-block (i.e., 4 × 4 × texel_size in the illustrated embodiment) |
| texel_size | is the number of bytes required to store one texel of the texture |

It should be noted that several other known methodologies could be used for determining the specific texture addresses for the L1 sub-block 340 within the L1 cache 250 and the L3 memory 230 as opposed to the methodologies described above. Accordingly, it will be appreciated that one of ordinary skill in the art could utilize such other methodologies for determining the memory address of the L1 sub-block 340 without departing from the spirit and scope of the present invention.

Figure 7A:
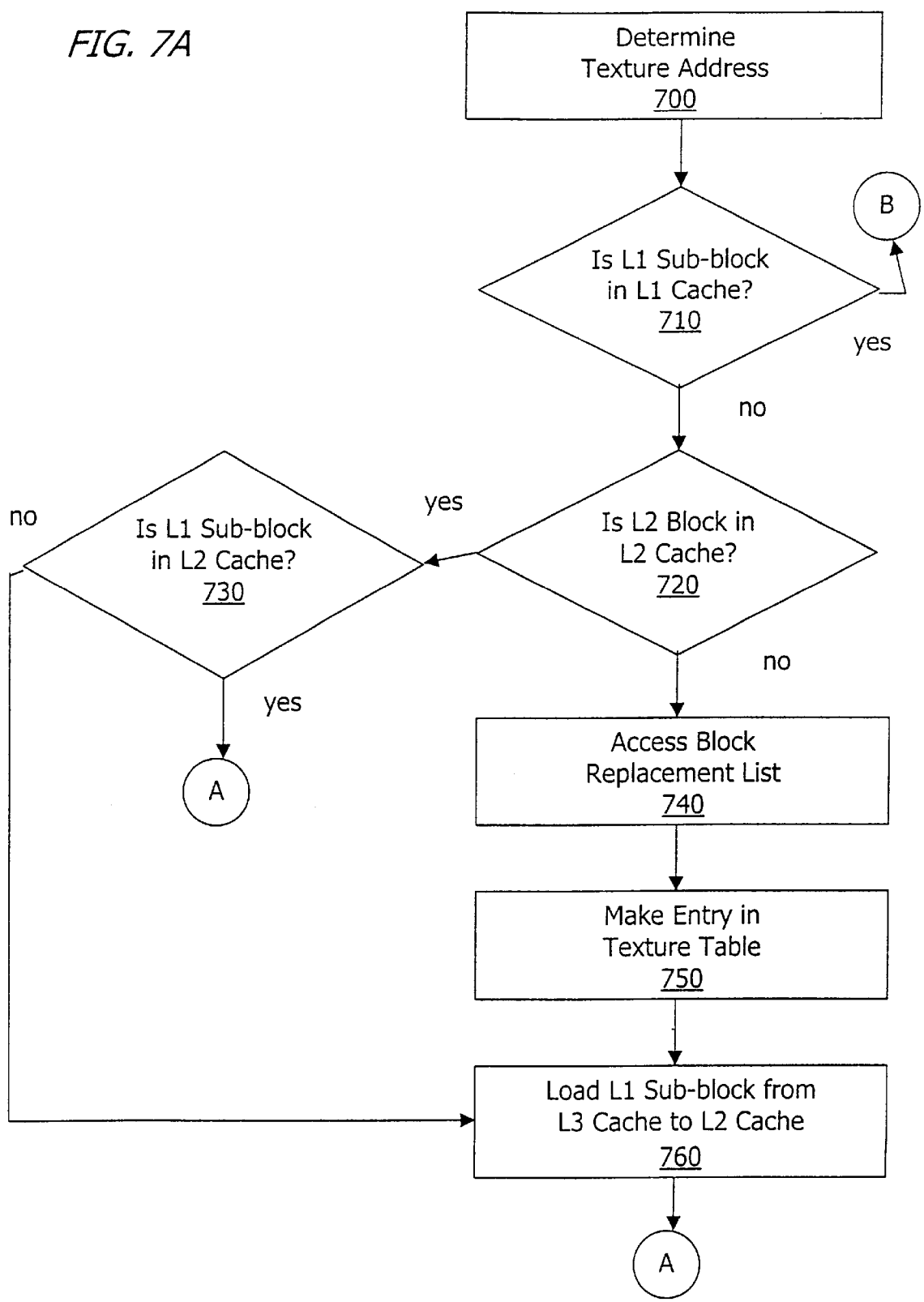
FIGS. 7A and B illustrate the process used to perform the demand caching of textures in accordance with an embodiment of the invention.
Figure 7B:
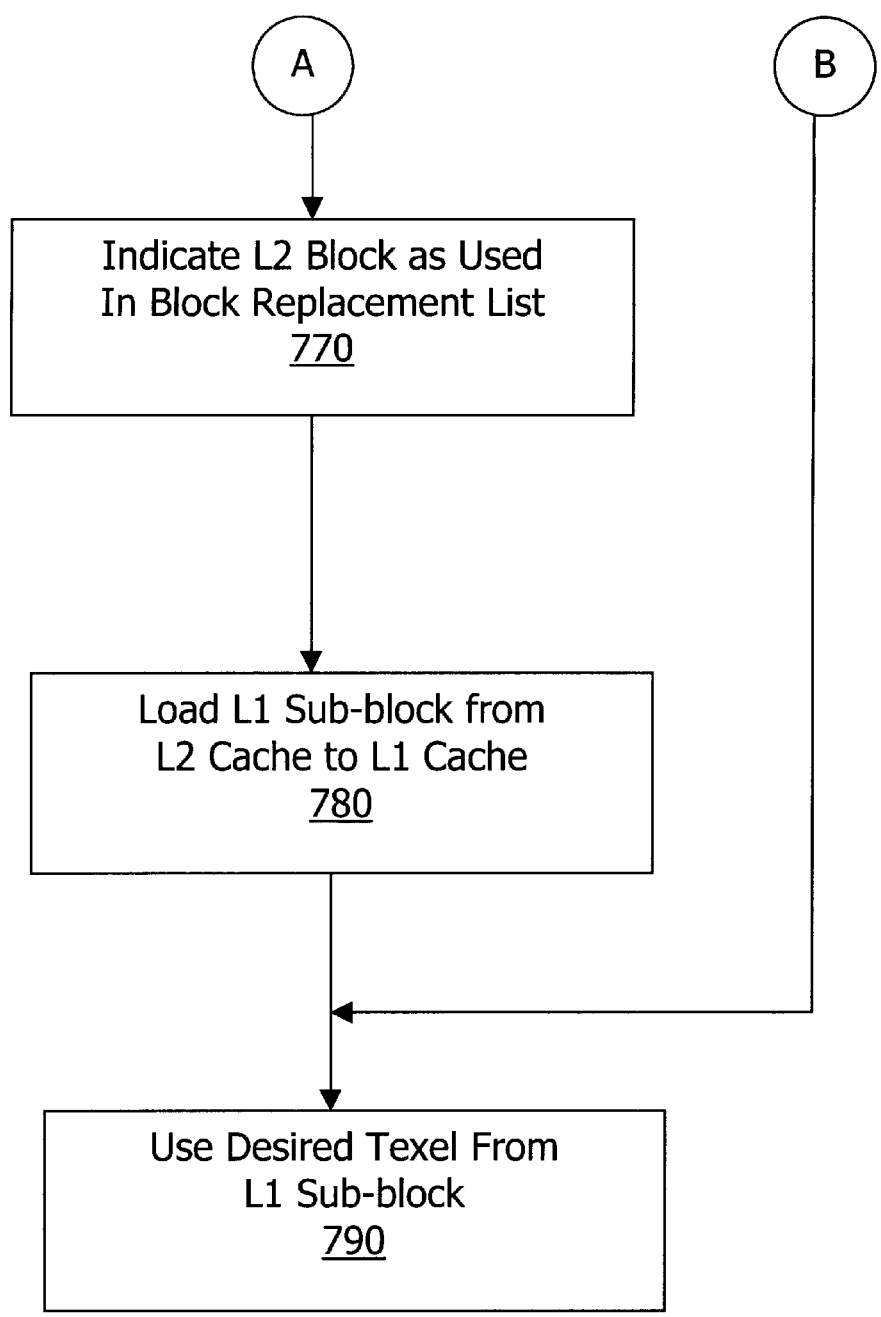

Now turning to FIGS. 7A and B, the process used by the GA 240 for demand caching of textures from memory is shown. The process commences at step 700 where the texture address is determined for the L2 texture block 320 and L1 sub-block 340 that contain the desired texel required by the GA 240. As mentioned, the texture address for a particular L1 sub-block 340 will be different for each of the memories of L1, L2, and L3. Accordingly, three different texture addresses (i.e., $L1_{addr\_L1cache}$, $L1_{addr\_L2cache}$, and $L1_{addr\_L3mem}$) are determined for the same L1 sub-block 340 using the procedures previously described. The texture address $L2_{addr\_L2cache}$ for the L2 block 320 is also determined. Once the GA 240 obtains these texture addresses, at step 710, it is determined whether the L1 sub-block 340 (containing the desired texel) is in the L1 cache 250 using $L1_{addr\_L1cache}$. If the L1 sub-block 340 is present in the L1 cache 250, the process continues to step 790 where the GA 240 extracts the desired texel from the L1 sub-block 340 and applies such texel to the primitive. However, if the L1 sub-block 340 is not present in the L1 cache 250, then the process continues to step 720, where it is determined whether or not an L2 cache block 270, allocated for the L1 sub-block 340, is present within the L2 cache 260. This is accomplished by accessing the texture table 400, and determining if the L2 cache block 270 had been allocated in the L2 cache 260 to hold the L2 texture block 320 (which contains the desired L1 sub-block 340). If the entry for L2_block_cache 440 is NULL in the texture table 400, then no L2 cache block 270 has yet been allocated, and the process proceeds to step 740. If L2_block_cache 440 is non-NULL, then an L2 cache block 270 had been allocated, and the process proceeds to step 730. At step 730, it is determined if the desired L1 sub-block 340 had already been downloaded to the allocated L2 cache block 270 within the L2 cache 260. This is done by determining if the sector bit 450 corresponding to the L1 sub-block 340 (that possesses the desired texel) has a value of "1", thus indicating that such L1 sub-block 340 has been loaded into the L2 cache block 270 within the L2 cache 260. If the L1 sub-block 340 had not been loaded (i.e., the sector bit is "0"), then the process continues to step 760. However, if the sector bit 450 corresponding to the L1 sub-block 340 indicates that such sub-block is in the L2 cache 260 (i.e., the sector bit is "1"), then the process continues to step 770. At step 770, it is indicated in the block replacement list 500 that the L2 cache block 270 has recently been used (i.e., the L2_block_cache row of the block replacement list 500 is found, and the active bit 550 for that entry is set to "1"). Subsequently, at step 780 the L1 sub-block 340 is loaded from the L2 cache 260 to the L1 cache 250, and the GA 240 (at step 790) extracts the desired texel from such L1 sub-block 340 for application to the primitive.

If it was determined at step 720 that the L2 cache block 270 was not found within the L2 cache 260, then it is assumed that the L1 sub-block 340 is present within the L3 memory 230. Accordingly, at step 740, the block replacement list is accessed to determine which of the L2 cache blocks 270 currently residing in the L2 cache 260 should be replaced. That is, approximately the least recently used L2 cache block 270 in the L2 cache 260 is deleted to make room for the L2 texture block 320 (containing the desired texel) when it is loaded from the L3 memory 230. At step 750, an entry is made in the texture table 400 to indicate the designation of the new L2 cache block 270. Then the process continues at step 760, where only the L1 sub-block 340 of the L2 texture block 320 (containing the desired texel) is loaded into the L2 cache 260 from the L3 main memory 230. As previously mentioned, the reason for loading just the L1 sub-block 340 is to conserve bandwidth between the L3 memory 230 and the L2 cache 260. Subsequently, at step 770, the block replacement list 500 is accessed to indicate the newly allocated L2 cache block 270 as being used. The same L1 sub-block 340 that was loaded into the L2 cache 260 is also loaded into the L1 cache 250, at step 780. In one embodiment, this step 780 occurs simultaneously with step 760. That is, the L1 sub-block 340 is loaded simultaneously into the L1 and L2 caches 250, 260 from the L3 memory 230. This is possible because (referring to FIG. 2A) as the L1 sub-block 340 is loaded from the L3 memory 230 to the L2 cache 260, the L1 sub-block 340 must go through the GA 240. Therefore, as the L1 sub-block 340 passes through the GA 240 (enroute to the L2 cache 260), the GA 240 also loads a copy of the L1 sub-block 340 into its L1 cache 250 as well. As previously mentioned, albeit it may seem redundant to load the same L1 sub-block from the L3 memory 230 to both the L2 and L1 caches 260, 250, such can actually improve the system performance because the L2 cache 260 most likely will hold onto the L1 sub-block 340 longer than will the L1 cache 250. Thus, if such L1 sub-block 340 is subsequently required again by the GA 240, the L1 sub-block 340 can be quickly retrieved from the L2 cache 260 as opposed to retrieving it from the slower L3 memory 230. Continuing with the process, after loading the L1 sub-block

340 into the L1 cache 250 at step 780, the GA 240 extracts the desired texel from the L1 sub-block 340 (at step 790) and applies such texel to the primitive.

The method and apparatus disclosed and claimed herein can be made and executed without undue experimentation in light of the present disclosure. While the method and apparatus of this invention has been described in terms of an embodiment, it will be apparent to those of skill in the art that variations may be applied to the apparatus and in the steps or in the sequence of steps of the method described herein without departing from the concept, spirit and scope of the invention. All such modifications apparent to those skilled in the art are deemed to be within the spirit, scope and concept of the invention as defined by the appended claims.

What is claimed is:

1. A method comprising:
   locating a texture within a first memory;
   dividing the texture into a plurality of blocks, a block size selected to be suitable for storage in a second memory;
   dividing the blocks into a plurality of sub-blocks, a sub-block size selected to be suitable for storage in a third memory; and
   loading a sub-block for a graphics operation to the third memory when the sub-block is loaded to the second memory.

2. The method of claim 1 further comprising:
   loading a sub-block for a graphics operation to the second and third memories using a first processor;
   tracking which sub-blocks are loaded in the second memory using entries in a table; and
   updating the entries using a second processor.

3. The method of claim 2 further comprising:
   the table comprising a bit field identifying which sub-blocks are loaded in the second memory.

4. The method of claim 2 further comprising:
   searching for a block in the second memory to be replaced by the sub-block;
   beginning the search for the block to replace at a row in the second memory identified by a variable; and
   updating the variable to identify the row where the block to replace is found.

5. The method of claim 1 in which loading the sub-block from the first memory to the second and third memories further comprises:
   loading the sub-block first to the second memory and subsequently to the third memory.

6. The method of claim 2 in which determining whether the sub-block is stored within the second memory further comprises:
   determining a block number for a block comprising the sub-block; and
   applying the block number to a table, the table comprising a plurality of sector bits corresponding to the block number, one sector bit of the plurality of sector bits identifying the presence or absence of the texture sub-block in the second memory.

7. A system comprising:
   a first processor;
   a first memory coupled to the processor by way of a bus, the first memory to store a texture, the texture divided into a plurality of blocks, the blocks divided into a plurality of sub-blocks;
   a second memory, a size of a block of the plurality of blocks selected such that the block is suitable to store in the second memory; and
   a third memory, a size of a sub-block of the plurality of sub-blocks selected such that the sub-block is suitable to store in the third memory, the first processor configured to load a sub-block for a graphics operation to the third memory when the processor loads the sub-block to the second memory.

8. The system of claim 7 in which the first processor comprises a graphics accelerator and the first memory comprises the main memory of a computer system, the system further comprising a table having entries, the system having a second processor configured to update the entries.

9. The system of claim 8 in which the table comprises a bit field identifying which sub-blocks are loaded in the second memory.

10. The system of claim 8
    further comprising a variable to identify a starting row of a search for a block in the second memory to be replaced by the sub-block, the second processor to update the variable to identify the row where the block to replace is found.

11. The system of claim 8 in which in which the graphics accelerator is adapted to determine whether a texture sub-block to apply to a graphics primitive is present within one of the second and third memories and to load the texture sub-block from the first memory first to the second memory and subsequently to the third memory in response to the texture sub-block not being present in one of the second or third memories.

12. The system of claim 8 in which the second processor is adapted to determine a block number for a texture block comprising a texture sub-block and apply the block number to a table to determine whether the texture sub-block is stored in the second memory.

13. The system of claim 12 in which the table comprises a plurality of sector bits corresponding to the block number, one sector bit of the plurality of sector bits identifying the presence or absence of the texture sub-block in the second memory.

14. The system of claim 7 in which the third memory is resident on the graphic processor.

15. The system of claim 12 in which the second memory comprises an external synchronous DRAM.

16. The system of claim 7 in which the second memory comprises an RDRAM.

* * * * *

UNITED STATES PATENT AND TRADEMARK OFFICE
CERTIFICATE OF CORRECTION

PATENT NO.   : 6,130,680
DATED        : October 10, 2000
INVENTOR(S)  : Cox et al.

It is certified that error appears in the above-identified patent and that said Letters Patent is hereby corrected as shown below:

Column 10,
Line 61, delete "$W_2$", insert -- $W_{L2}$ --.

Signed and Sealed this

Fourth Day of June, 2002

Attest:

Attesting Officer

JAMES E. ROGAN
Director of the United States Patent and Trademark Office